United States Patent
Tabatabai et al.

(10) Patent No.: US 10,750,197 B2
(45) Date of Patent: Aug. 18, 2020

(54) ENHANCEMENTS IN SAMPLE ADAPTIVE OFFSET (SAO) FOR HIGH EFFICIENCY VIDEO ENCODER (HEVC)

(71) Applicant: SONY CORPORATION, Tokyo (JP)

(72) Inventors: Ali Tabatabai, Cupertino, CA (US); Jun Xu, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/503,763

(22) Filed: Jul. 5, 2019

(65) Prior Publication Data

US 2019/0349596 A1    Nov. 14, 2019

Related U.S. Application Data

(63) Continuation of application No. 13/801,553, filed on Mar. 13, 2013.

(Continued)

(51) Int. Cl.
*H04N 19/46* (2014.01)
*H04N 19/82* (2014.01)
*H04N 19/91* (2014.01)

(52) U.S. Cl.
CPC .............. *H04N 19/46* (2014.11); *H04N 19/82* (2014.11); *H04N 19/91* (2014.11)

(58) Field of Classification Search
CPC .... H04N 19/10; H04N 19/102; H04N 19/105; H04N 19/119; H04N 19/13;

(Continued)

(56) References Cited

U.S. PATENT DOCUMENTS

| 2009/0040375 A1 | 2/2009 | Jen |
| 2012/0082241 A1 | 4/2012 | Tsai et al. |

(Continued)

FOREIGN PATENT DOCUMENTS

| CN | 101459845 A | 6/2009 |
| CN | 102377911 A | 3/2012 |

(Continued)

OTHER PUBLICATIONS

Kim, et al., "Non-CE1: LCU SAO Enable Flag Coding", JCT-VC of ITU-T SG16 WP3 and ISO/IEC JTC1/SC29/WG11, Document: JCTVC-I0193, Geneva, CH, Apr. 27-May 7, 2012, 10 pages.

(Continued)

*Primary Examiner* — Jeffery A Williams
(74) *Attorney, Agent, or Firm* — Chip Law Group

(57) ABSTRACT

An encoder/decoder is described using enhanced signaling mechanisms SAO parameters. The various parameters are signaled in various ways according to different embodiments of the invention. In a first embodiment (embodiment A), SAO on/off is decoupled form SAO type coding, with SAO on/off flags being jointly encoded for all color components. The second embodiment (embodiment B), is similar to embodiment A, but modified for application to JCTVC-J0268. In a third embodiment separate signaling is provided for SAO on/off, SAO types BO and EO, and for BO and EO side information (classes or band position). Each of these enhanced SAO signaling mechanisms provide enhanced coding efficiency.

13 Claims, 3 Drawing Sheets

Related U.S. Application Data

(60) Provisional application No. 61/670,454, filed on Jul. 11, 2012, provisional application No. 61/667,331, filed on Jul. 2, 2012, provisional application No. 61/667,321, filed on Jul. 2, 2012, provisional application No. 61/662,118, filed on Jun. 20, 2012, provisional application No. 61/659,197, filed on Jun. 13, 2012.

(58) Field of Classification Search
CPC .. H04N 19/134; H04N 19/132; H04N 19/169; H04N 19/189; H04N 19/503
USPC .......................................................... 375/240
See application file for complete search history.

(56) References Cited

U.S. PATENT DOCUMENTS

| | | |
|---|---|---|
| 2012/0082243 A1 | 4/2012 | Baylon et al. |
| 2012/0177107 A1 | 7/2012 | Fu et al. |
| 2012/0300839 A1 | 11/2012 | Sze et al. |
| 2013/0051454 A1 | 2/2013 | Sze et al. |
| 2013/0094569 A1 | 4/2013 | Chong et al. |
| 2013/0114678 A1* | 5/2013 | Baylon ................ H04N 19/176 375/240.02 |
| 2013/0315295 A1 | 11/2013 | Terada et al. |
| 2013/0315297 A1 | 11/2013 | Sasai et al. |
| 2013/0336592 A1 | 12/2013 | Matsunobu et al. |
| 2014/0192861 A1 | 7/2014 | Chuang et al. |
| 2015/0098513 A1* | 4/2015 | Fu ......................... H04N 19/91 375/240.25 |

FOREIGN PATENT DOCUMENTS

| | | |
|---|---|---|
| JP | 2012-005113 A | 1/2012 |
| JP | 2015-521443 A | 7/2015 |
| WO | 2011/157084 A1 | 12/2011 |
| WO | 2012/063878 A | 5/2012 |
| WO | 2012/092787 A1 | 7/2012 |
| WO | 2013/177975 A | 12/2013 |

OTHER PUBLICATIONS

Office Action for KR Patent Application No. 10-2016-7029235, dated Jun. 19, 2018, 03 pages of Office Action and 04 pages of English Translation.
Maani, et al., "SAO Type Coding Simplification", Joint Collaborative Team on Video Coding (JCT-VC) of ITU-T SG 16 WP 3 and ISO/IEC JTC 1/SC 29/WG 11, Document: JCTVC-I0246, Apr. 27-May 7, 2012, 03 pages.
Sole, et al. "AhG6: Bypass Bins Grouping in SAO", Joint Collaborative Team on Video Coding (JCT-VC) of ITU-T SG 16 WP 3 and ISO/IEC JTC 1/SC 29/WG 11, Document: JCTVC-J0054, Jul. 11-20, 2012, 03 pages.
Minezawa, et al. "Non-CE1: Improved Edge Offset Coding for SAO", Joint Collaborative Team on Video Coding (JCT-VC) of ITU-T SG 16 WP 3 and ISO/IEC JTC 1/SC 29/WG 11, Document: JCTVC-I0066, Apr. 27-May 7, 2012, 06 pages.
Bici, et al. "Context Reduction for Merge Index Coding", Joint Collaborative Team on Video Coding (JCT-VC) of ITU-T SG16 WP3 and ISO/IEC JTC1/SC29/WG11, Document: JCTVC-H0251, Feb. 1-10, 2012, 04 pages.
Seregin, et al. "Bypass Bins for Reference Index and Delta QP Coding", Joint Collaborative Team on Video Coding (JCT-VC) of ITU-T SG 16 WP 3 and ISO/IEC JTC 1/SC 29/WG 11, Document: JCTVC-I0594, Apr. 27-May 7, 2012, 06 pages.
Extended European Search Report of EP Patent Application No. 17197373.8, dated Jan. 26, 2018, 09 pages.
Office Action for JP Patent Application No. 2015-520538, dated Mar. 8, 2016, 03 pages of office Action and 03 pages of English translation.
Office action for KR Patent Application No. 10-2014-7036694, dated Mar. 7, 2016, 03 pages of office action in 04 pages of English translation.
Wu, et al., "Introduction to the High-Efficiency Video Coding Standard", ZTE Communications, vol. 10, No. 2, Jun. 2012, pp. 5-11.
International Search Report and Written Opinion of PCT Application No. PCT/US2013/048353, dated Oct. 17, 2013, 12 pages of ISRWO.
Wiegand, et al., "WD3: Working Draft 3 of High-Efficiency Video Coding" Version 8, [retrieved on Oct. 4, 2013], Retrieved form the internet: <URL: http://phenix.it-sudpris.eu/jct/doc_end_user/current_document.php?id=2471>.entire document, 2011.
Daniel Palomino, "WD3: danielpalomino/intra-decision/ofg/encoder_intra.cfg", [retrieved on Oct. 4, 2013]. Retrieved from the internet:<URL: https://github.com/danielpalomino/intra-decision/blob/master/cfg/encoder_intra.cfg> entire document, 2011.
Sze, et al., "Reduction in context coded bins for ref_idx and cu_qp_delta", [retrieved on Oct. 4, 2013] Retrieved from the internet: <URL: http://phenix.int-evry.fr/jct/doc_end_user/current_document.php?id=5462> entire document, Jul. 2, 2012.
Non-Final Office Action for U.S. Appl. No. 13/801,553, dated Jun. 12, 2018, 07 pages.
Non-Final Office Action for U.S. Appl. No. 13/801,553, dated Jul. 19, 2017, 11 pages.
Non-Final Office Action for U.S. Appl. No. 13/801,553, dated Dec. 21, 2016, 12 pages.
Non-Final Office Action for U.S. Appl. No. 13/801,553, dated Mar. 9, 2016, 16 pages.
Non-Final Office Action for U.S. Appl. No. 13/801,553, dated Mar. 12, 2015, 28 pages.
Final Office Action for U.S. Appl. No. 13/801,553, dated Dec. 13, 2018, 10 pages.
Final Office Action for U.S. Appl. No. 13/801,553, dated Nov. 1, 2017, 12 pages.
Final Office Action for U.S. Appl. No. 13/801,553, dated Apr. 6, 2017, 09 pages.
Final Office Action for U.S. Appl. No. 13/801,553, dated Jul. 7, 2016, 14 pages.
Final Office Action for U.S. Appl. No. 13/801,553, dated Oct. 26, 2015, 31 pages.
Advisory Action for U.S. Appl. No. 13/801,553, dated Feb. 26, 2019, 03 pages.
Advisory Action for U.S. Appl. No. 13/801,553, dated Feb. 16, 2018, 04 pages.
Advisory Action for U.S. Appl. No. 13/801,553, dated Jun. 22, 2017, 03 pages.
Advisory Action for U.S. Appl. No. 13/801,553, dated Nov. 4, 2016, 03 pages.
Notice of Allowance for U.S. Appl. No. 13/801,553, dated Apr. 4, 2019, 05 pages.
Sze, et al., "Parallelization of CABAC transform coefficient coding for HEVC", Picture Coding Symposium, May 7-9, 2012, 04 pages.
Extended European Search Report of EP Patent Application No. 13813646.0, dated Jun. 9, 2017, 09 pages.
Office Action for CN Patent Application No. 201710430359.6, dated May 28, 2019, 07 pages of Office Action and 09 pages of English Translation.
Office Action for CN Patent Application No. 201710429615.X, dated Jun. 5, 2019, 06 pages of Office Action and 09 pages of English Translation.
Office Action for CN Patent Application No. 201710429617.9, dated Jun. 10, 2019, 09 pages of Office Action and 09 pages of English Translation.
Maani, et al., "SAO Type Coding Simplification" Joint Collaborative Team on Video Coding (JCT-VC) of ITU-T SG16 WP3 and ISO/IEC/JTC1/SC29/WG11, 9th meeting, Geneva, CH, Apr. 27-May 7, 2012, 04 pages.
Bross, et al., "High Efficiency Video Coding (HEVC) Text Specification Draft 7" Joint Collaborative Team on Video coding (JCT-VC) of ITU-T SG16 WP3 and ISO/IEC/JTC1/SC29/WG11, 9th meeting, Geneva, CH, Apr. 27-May 7, 2012, 03 pages.

(56) References Cited

OTHER PUBLICATIONS

Oguz Bici, "Context Reduction for merge index coding" Joint Collaborative Team on Video Coding (JCT-VC) of ITU-T SG16 WP3 and ISO/IEC/JTC1/SC29/WG11, 8th meeting, San Jose, CA, USA, Feb. 1-10, 2012, 05 pages.
Sole, et al., "AhG6: Bypass bins grouping in SAO" Joint Collaborative Team on Video Coding (JCT-VC) of ITU-T SG16 WP3 and ISO/IEC/JTC1/SC29/WG11, 10th meeting, Stockholm, SE, Jul. 11-20, 2012, 04 pages.
Akira Minezawa, "Non-CE1: Improved edge offset coding for SAO" Joint Collaborative Team on Video Coding (JCT-VC) of ITU-T SG16 WP3 and ISO/IEC/JTC1/SC29/WG11, 9th meeting, Geneva, CH, Apr. 27-May 7, 2012, 07 pages.
Kwon, et al., "Cross-check of JTVC-10246 on SAO Type Coding Simplification" Joint Collaborative Team on Video Coding (JCT-VC) of ITU-T SG16 WP3 and ISO/IEC/JTC1/SC29/WG11, 9th meeting, Geneva, CH, Apr. 27-May 7, 2012.
Sze, et al., "Parallelization of CABAC Transform Coefficient Coding for HEVC", 2012 Picture Coding Symposium, IEEE, Poland, May 7-9, 2012, pp. 509-512.
Notice of Allowance for U.S. Appl. No. 13/801,553, dated Aug. 6, 2019, 5 pages.
Manni, et al., "SAO Type Coding Simplification" Joint Collaborative Team on Video Coding (JCT-VC) of ITU-T SG16 WP3 and ISO/IEC/JTC1/SC29/WG11, Document: JCTVC-10246, 9th meeting, Geneva, CH, Apr. 27-May 7, 2012, 03 pages.
Bici, et al., "Context Reduction for merge index coding" Joint Collaborative Team on Video Coding (JCT-VC) of ITU-T SG16 WP3 and ISO/IEC/JTC1/SC29/WG11, Document: JCTVC-H0251, 8th meeting, San Jose, CA, USA, Feb. 1-10, 2012, 04 pages.
Minizawa, et al., , "Non-CE1: Improved Edge Offset Coding for SAO" Joint Collaborative Team on Video Coding (JCT-VC) of ITU-T SG16 WP3 and ISO/IEC/JTC1/SC29/WG11, Document: JCTVC-I0066 r2, 9th meeting, Geneva, CH Apr. 27-May 7, 2012, 12 pages.
Office Action for CN Patent Application No. 201710435850.8, dated Nov. 6, 2019, 07 pages of Office Action and 09 pages of English Translation.
Office Action for CN Patent Application No. 201710429617.9, dated Dec. 2, 2019, 09 pages of Office Action and 12 pages of English Translation.
Office Action for CN Patent Application No. 201710429615.X, dated Dec. 23, 2019, 08 pages of Office Action and 10 pages of English Translation.
Bross, et al., "High efficiency video coding (HEVC) text specification draft 7", Joint Collaborative Team on Video Coding (JCT-VC) of ITU-T SG16 WP3 and ISO/IEC JTC1/SC29/WG 11, Document: I1003_d98, 9th Meeting: Geneva, Apr. 27-May 7, 2012, 3 pages.
Office Action for CN Patent Application No. 201710132900.5, dated Sep. 30, 2019, 8 pages of Office Action and 11 pages of English Translation.
Ehsan Maani, "SAO Type Coding Simplification", Joint Collaborative Team on Video Coding (JCT-VC) of ITU-T SG16 WP3 and ISO/IEC JTC1/SC29/WG 11, 9th meeting, Geneva, CH, Apr. 27, 2012, 03 pages.
Office Action for CN Patent Application No. 201710430359.6, dated Oct. 18, 2019, 11 pages of Office Action and 8 pages of English Translation.
Minezawa, et al., "Non-CE1: Improved edge offset coding for SAO", Joint Collaborative Team on Video Coding (JCT-VC) of ITU-T SG16 WP3 and ISO/IEC JTC1/SC29/WG11, 9th meeting, Geneva, CH, Apr. 27-May 7, 2012, 06 pages.
Extended European Search Report of EP Application No. 19191334.2, dated Oct. 1, 2019, 11 pages.
Sole, et al., "AhG6: Bypass bins for grouping in SAO", Joint Collaborative Team on Video Coding (JCT-VC) of ITU-T SG16 WP3 and ISO/IEC JTC1/SC29/WG11, 10th meeting, Stockholm, SE, Jul. 11-20, 2012, 03 pages.
Bici, et al., "Context reduction for merge index coding", Joint Collaborative Team on Video Coding (JCT-VC) of ITU-T SG16 WP3 and ISO/IEC JTC1/SC29/WG11, 8th meeting, San Jose, CA, USA, Feb. 1-10, 2012, 04 pages.
Seregin, et al., "Bypass bins for reference index and delta QP coding", Joint Collaborative Team on Video Coding (JCT-VC) of ITU-T SG16 WP3 and ISO/IEC JTC1/SC29/WG11, 9th meeting, Geneva, CH, Apr. 27-May 7, 2012, 06 pages.
Notice of Allowance for U.S. Appl. No. 13/801,553 dated Dec. 16, 2019.

* cited by examiner

ENHANCEMENTS IN SAMPLE ADAPTIVE OFFSET (SAO) FOR HIGH EFFICIENCY VIDEO ENCODER (HEVC)

CROSS-REFERENCE TO RELATED APPLICATIONS

This application is a continuation application of U.S. patent application Ser. No. 13/801,553, filed Mar. 13, 2013, which claims the benefit of priority from U.S. provisional patent application Ser. No. 61/670,454, filed Jul. 11, 2012, U.S. provisional patent application Ser. No. 61/667,321, filed Jul. 2, 2012, U.S. provisional patent application Ser. No. 61/667,331, filed Jul. 2, 2012, U.S. provisional patent application Ser. No. 61/662,118, filed Jun. 20, 2012, U.S. provisional patent application Ser. No. 61/659,197, filed Jun. 13, 2012 . Each of the foregoing applications is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to video encoding and decoding, and more particularly to enhanced signaling improvements to Sample Adaptive Offsets (SAO) within high-efficiency video coding (HEVC) systems.

2. Description of Related Art

A significant and ongoing demand continues for high efficiency video coding (HEVC) toward more optimal and scalable video compression. The Joint Collaborative Team on Video Coding (JCT-VC) of ITU-T and ISO/IEC MPEG continues enhancing a high efficiency video coding (HEVC) standard.

In HEVC, the frames are divided into coding tree blocks (CTBs) that can be further subdivided into coding units (CUs), such as using quadtree segmentation. A coding unit (CU) may have variable sizes depending on video content toward achieving a desired coding efficiency. CUs typically include a luminance component Y and two chroma components, U and V. The size of U and V components relate to the number of samples, and can be the same or different from that of the Y component, as depends upon the video sampling format. The CUs can be further subdivided into prediction unit (PU) partitions during intra-prediction and inter-prediction as well as transform units (TUs) defined for transform and quantization. Transform units (TU) generally refer to a block of residual data to which a transform is applied when generating transform coefficients.

HEVC introduces new elements over current video coding systems, such as H.264/AVC, and similar codecs. For example, although HEVC still involves motion compensated inter predictions, transforms, and entropy coding, it utilizes either arithmetic coding or variable length coding. In addition, following the deblocking filter is a sample adaptive offset (SAO) filter. The SAO filter unit operates once for each pixel in the CTB. For each CTB, a filter type and offset values are coded in the bitstream. There are two types of filters, specifically, edge and band filters. The band of a given sample is simply the upper 5 bits of its value. Then a band index is transmitted, along with the four offsets, that identifies four adjacent bands. So if the band index is 4, it means bands 4, 5, 6 and 7. If a pixel falls into one of these bands, the corresponding offset is added to it. In an edge filter an edge mode is transmitted (e.g., 0, 90, 45, 135 degrees). The offsets and filter modes are picked by the encoder toward making the CTB more closely match the source image.

The SAO filter considers the entire frame as a hierarchical quadtree. Quadrants in this quadtree are activated by the SAO transmitting syntax values which each represent an intensity band of pixel values referred to as band offset (BO) or the difference compared to neighboring pixel intensities referred to as edge offset (EO). For each type in SAO (BO and EO), transmitted offset values referred to as SAO offset are added to the corresponding pixels.

For example, HEVC working document 7 (WD 7) provides SAO on/off, 4 Edge Offset (EO) classes, and one Band Offset (BO). These SAO types are signaled to the decoder using a Unary code with two contexts for context-adaptive binary arithmetic coding (CABAC) coding, one on the first bin and one for the rest of the bins. In addition, for the BO type, band position is transmitted using FL codes. Context coded bins and by-pass coded bins are interleaved, which limit the CABAC engine throughput.

The present invention provides forms of type decoupling which improve the efficiency of SAO signaling within a video coding system.

BRIEF SUMMARY OF THE INVENTION

The present invention provides an improved mechanisms for enhanced signaling of SAO parameters exemplified in three primary inventive embodiments. The inventive apparatus and method changes SAO type coding in terms of syntax and binarization, provides new context modeling, and resolves interleaving of context coded bins and by-pass coded bins.

In a first embodiment (embodiment A), SAO on/off is enhanced by decoupling it with SAO on/off flags being jointly encoded for all color components. The lookup table for lcu_sao_enable_idx is removed, with an equation utilized instead. Truncated unary binarization is utilized for the code index. Then only the first bin is context coded and the other bins are encoded using by-pass mode.

The second embodiment (embodiment B), is similar to embodiment A, but applicable to JCTVC-J0268. SAO type is encoded with single context. Only the first bin is context coded with one dedicated context, while the remaining bins are encoded in bypass mode.

The third embodiment (embodiment C), provides separate signaling for SAO on/off, SAO types BO and EO, and for BO and EO side information (classes or band position). SAO type is binarized by truncated unary and encoded with only one context for the first bin. EO classes are encoded using fixed length code and by-pass mode. Both context coded bins and by-pass coded bins are grouped to improve throughput of CABAC.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

The inventive apparatus and method enhances SAO operation in HEVC encoders and decoders, while overcoming shortcomings of existing and proposed SAO signaling methods. In the developing High Efficiency Video Coding (HEVC) standard test model HM 7.0, each color component has one sample adaptive offset (SAO) type including on/off, EO types, and BO. Yet, it can be desirable to enhance SAO parameter signaling.

Introduction

Figure 1:
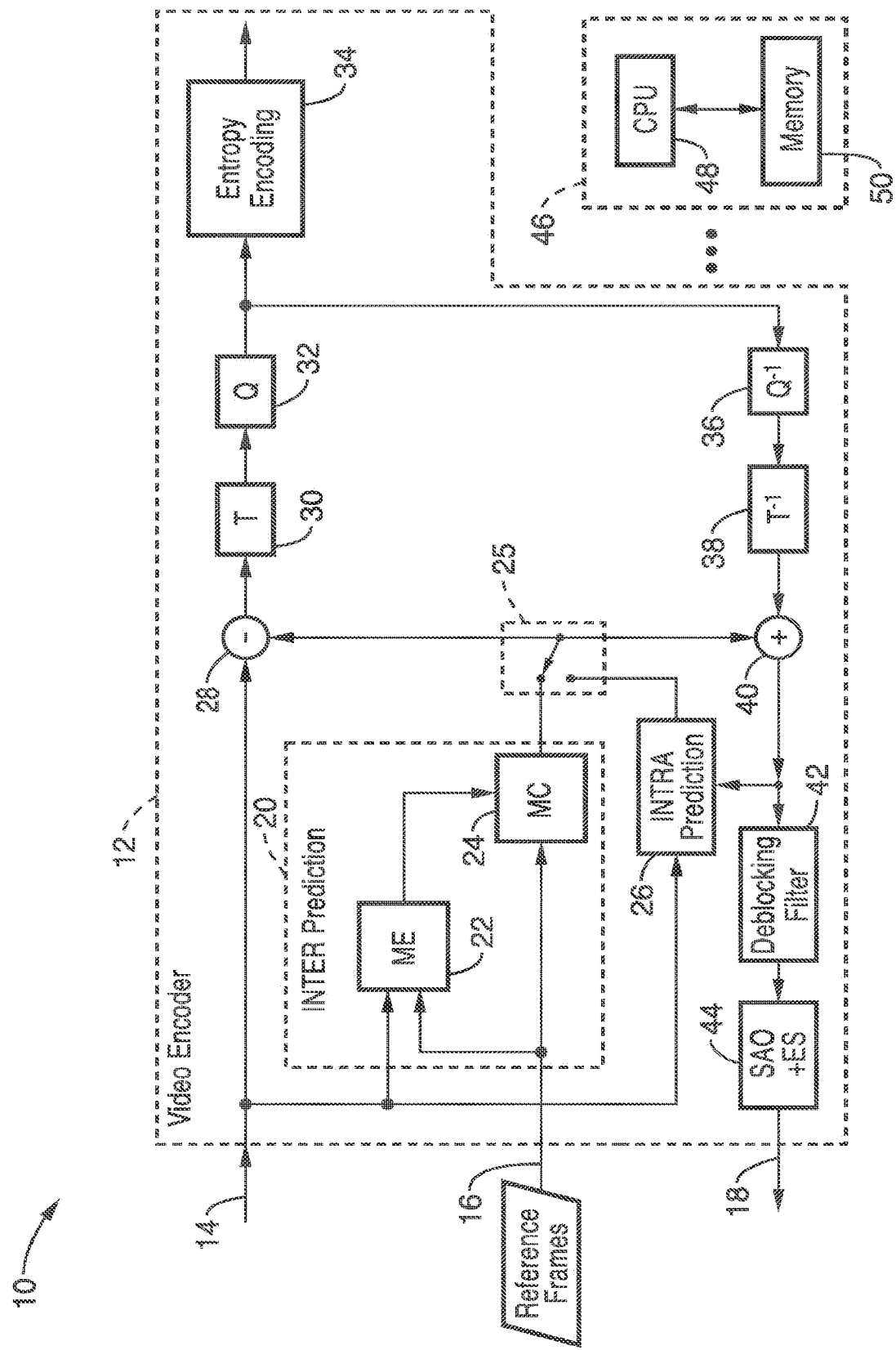
FIG. 1 is a schematic of a video encoder according to embodiments of the present invention.

FIG. 1 illustrates an example embodiment of a coding apparatus comprising an encoder 10 according to the invention with enhanced sample adaptive offsets (SAO).

The encoder 10 is shown with encoding elements 12 executed by a computing means 46 exemplified with one or more processors 48, along with one or more memory devices 50. It will be appreciated that elements of the present invention can be implemented as programming stored on a media, which can be accessed for execution by a CPU for an encoder and/or decoder.

In the example, video frame input 14 is shown along with reference frames 16 and frame output 18. Inter-prediction 20 is depicted with motion estimation (ME) 22 and motion compensation (MC) 24. Intra-prediction 26 is shown with switching 25 depicted between inter-prediction and intra-prediction. A sum junction 28 is shown with output to a forward transform 30 which is performed based on the predictions to generate transform coefficients of residual data. Quantization of the transform coefficients is performed at quantization stage 32, which is followed by entropy encoding 34. Inverse quantization 36 and inverse transform 38 operations are shown coupled to a summing junction 40.

Output of summing junction 40, is a decoded video signal which is received by a deblocking filter 42, the Sample Adaptive Offset (SAO) filter with inventive enhanced signaling (+ES) 44 to produce an output 18. The enhanced signaling can be provided according to the present invention utilizing any of three embodiments which are described in detail in the following sections.

Figure 2:
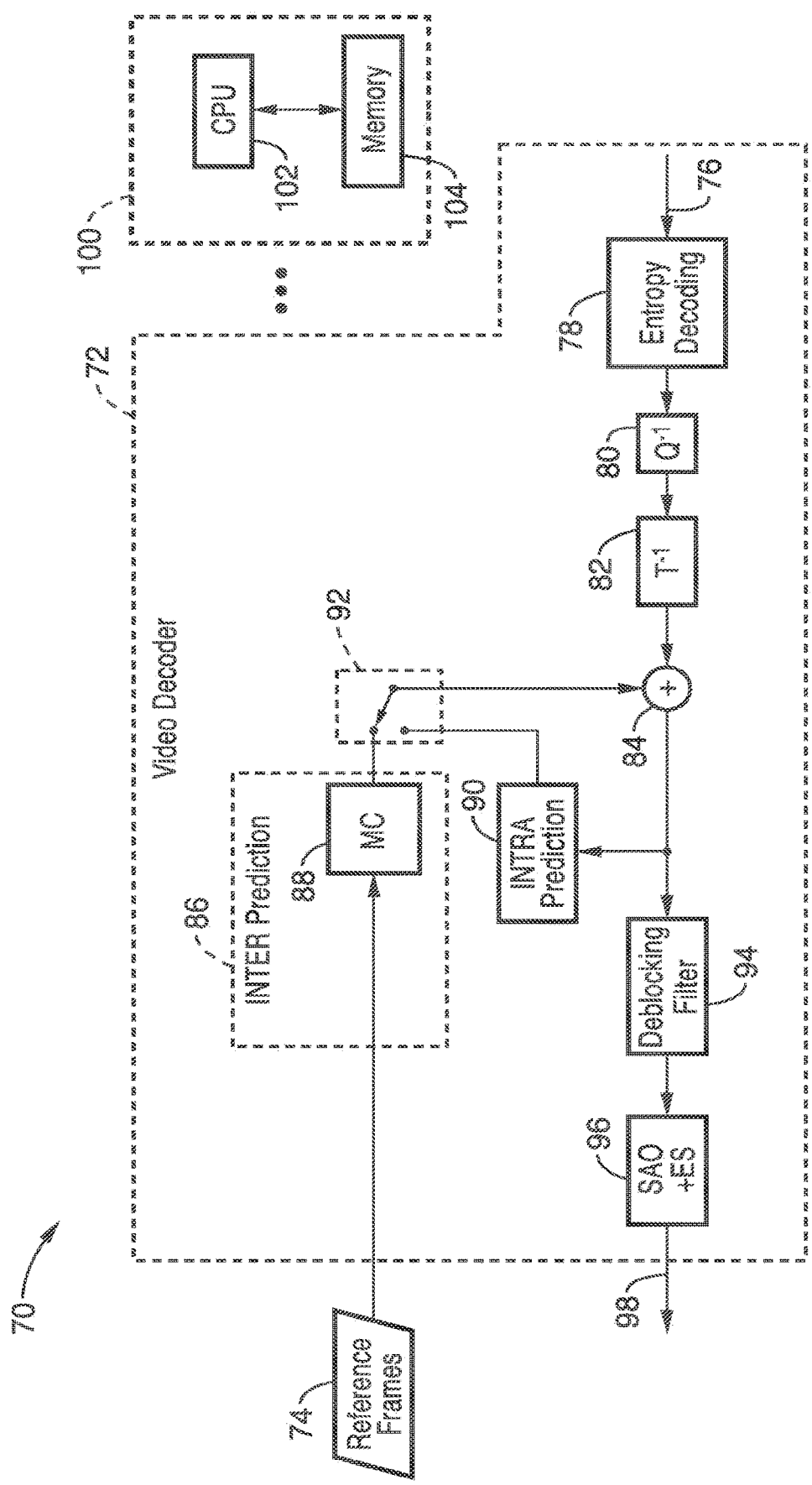
FIG. 2 is a schematic of a video decoder according to embodiments of the present invention.

FIG. 2 illustrates an example embodiment 70 of a decoder, shown with process blocks 72 and an associated processing means 102. It will be noted that the decoder is substantially a subset of the elements contained in encoder 10 of FIG. 1, operating on reference frames 74 and outputting video signal 100. The decoder blocks receive an encoded video signal 76 which is processed through entropy decoder 78, inverse quantization 80, inverse transform 82, and summing 84 between the inverse transform 82 output and the selection 92 between inter-prediction 86 shown with motion compensation 88 and a separate intra-prediction block 90. Output from summing junction 84 is received by a deblocking filter 94, followed by SAO module with inventive enhanced signaling (+ES) 96 to produce a video output 98.

It should be appreciated that the decoder can be implemented with a processing means 100 which comprises at least one processing device 102 and at least one memory 104 for executing programming associated with the decoding. In addition, it will be noted that elements of the present invention can be implemented as programming stored on a media, wherein said media can be accessed for execution by processing device (CPU) 102.

It will be recognized that elements of the present invention 10 and 70 are implemented for execution by a processing means 46 and 100, such as in response to programming resident in memory 50 and 104 which is executable on computer processor (CPU) 48 and 102. In addition, it will be appreciated that elements of the present invention can be implemented as programming stored on a media, wherein said media can be accessed for execution by CPU 48 and/or 102.

It should also be appreciated that the above programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

A. Embodiment A: Simplification of JCTVC-I0193

The enhancement to the decoupling of SAO on/off and types can be performed in two different variations. In the first two variations SAO on/off are decoupled from SAO type coding, with SAO on/off flags being encoded jointly for all color components.

In this first variation, a simplified JCTVC-I0193 embodiment is provided which combines SAO flags with the following changes. (1) The look-up table (e.g., Table 1) is replaced and a code index is generated with an equation as follows:

$$\text{code index} = (lcu\_sao\_\text{enable\_flag}Cr \ll 2) + (lcu\_sao\_\text{enable\_flag}Cb \ll 1) + lcu\_sao\_\text{enable\_flag}Y$$

In the above equation, truncated unary binarization is utilized for the code index. Only the first bin is context coded and other bins are encoded in the by-pass mode.

The type coding, seen in Table 2, and offset coding then remain the same as JCTVC-I0193 extended to HM7.0.

Table 3 illustrates an example of slice data syntax.

Table 4 illustrates SAO parameter syntax with descriptor.

Table 5 illustrates type information for BO and EO. The value sao_band_position [cIdx][rx][ry] indicates the displacement of the band offset of the pixel range when sao_type_idx [cIdx][rx][ry] is equal to 4. The value sao_offset_sign[cIdx][rx][ry][i] specifies the sign of sao_offset [cIdx][rx][ry][i] when sao_type_index is equal to 4. The variable offset sign is derived as follows. If sao_type_idx [cIdx][rx][ry] is less than 4 and i is larger than 1, offset sign is set to −1. Otherwise (sao_type_idx [cIdx][rx][ry] is equal to 4 or i is less than 2), offset sign is set to 1.

Table 6 illustrates how lcu_sao_enable_idx specifies the LCU SAO enable flag values of three color components.

B. Embodiment B: JCTVC-J0268+Simplification of JCTVC-I0193

In this embodiment, the simplified solution above is combined with the solution from JCTVC-J0268 on SAO signaling to provide an enhanced signaling structure for SAO. This results in a small change in the SAO type due to the decoupling of SAO on/off in simplifying JCTVC-I0193 described above. The SAO signaling of the combined solution is listed in order as follows: (1) First, the SAO on/off index for three on/off flags from all color components is signaled. The index is binarized using truncated unary code. Only the first bin is context coded with one dedicated context. The rest of the bins are encoded in by-pass mode. For each color component, if SAO is enabled, then the process moves to the next step (step 2); otherwise, finish SAO signaling. (2) SAO type as shown in Table 7 is encoded with one context. (3) Offsets including absolute values and signs are encoded as HM7.0 does. (4) If the SAO type is EO, then EO classes are signaled using sao_eo_class as shown in Table 8, which is encoded by FLC with by-pass. (5) If SAO type is BO, then band positions are signaled as HM7.0 does.

Table 9 illustrates a specification of slice data syntax.

Table 10 provides an example of SAO parameter syntax for this embodiment.

Table 11 illustrates specifying SAO type.

Table 12 illustrates how lcu_sao_enable_idx indicates the LcuSaoEnableFlag values of three color components.

Table 13 exemplifies the parameter sao_eo_class[cIdx][rx][ry] indicating edge offset type of the current coding tree block at position rx and ry for the color component cIdx. When sao_eo_class [cIdx][rx][ry] is not present, it is inferred as follows.

If sao_merge_left_flag is equal to 1, then sao_eo_class[*cIdx*][*rx*][*ry*]

is set equal to sao_eo_class[*cIdx*][*rx*−1][*ry*].

Otherwise, if sao_merge_up flag is equal to 1, then sao_eo_class[*cIdx*][*rx*][*ry*]

is set equal to sao_eo_class[*cIdx*][*rx*][*ry*−1].

Otherwise, sao_merge_up_flag is not equal to 1, whereby sao_eo_class [cIdx][rx][ry] is set equal to 0.

The parameter sao_band_position[cIdx][rx][ry] indicates the displacement of the band offset of the pixel range when sao_type_idx[cIdx][rx][ry] is equal to 0.

The parameter sao_offset_sign[cIdx][rx][ry][i] specifies the sign of sao_offset[cIdx][rx][ry][i] when sao_type_index is equal to 0.

The variable offsetSign is derived as follows.

If sao_type_idx[cIdx][rx][ry] is equal to 1 and i is greater than 1, offsetSign is set equal to −1.

Otherwise, if sao_type_idx[cIdx][rx][ry] is equal to 1 and i is less than 2, offsetSign is set equal to 1.

C. Embodiment C: Type First SAO Coding

In this embodiment the coding of SAO type is reconfigured to have separate signaling for SAO On/Off, SAO type BO and EO and EO/BO side information (classes or band positions). The embodiment also groups both context coded bins and by-pass coded bins to improve throughput for context-based adaptive binary arithmetic coding (CABAC).

Figure 3:
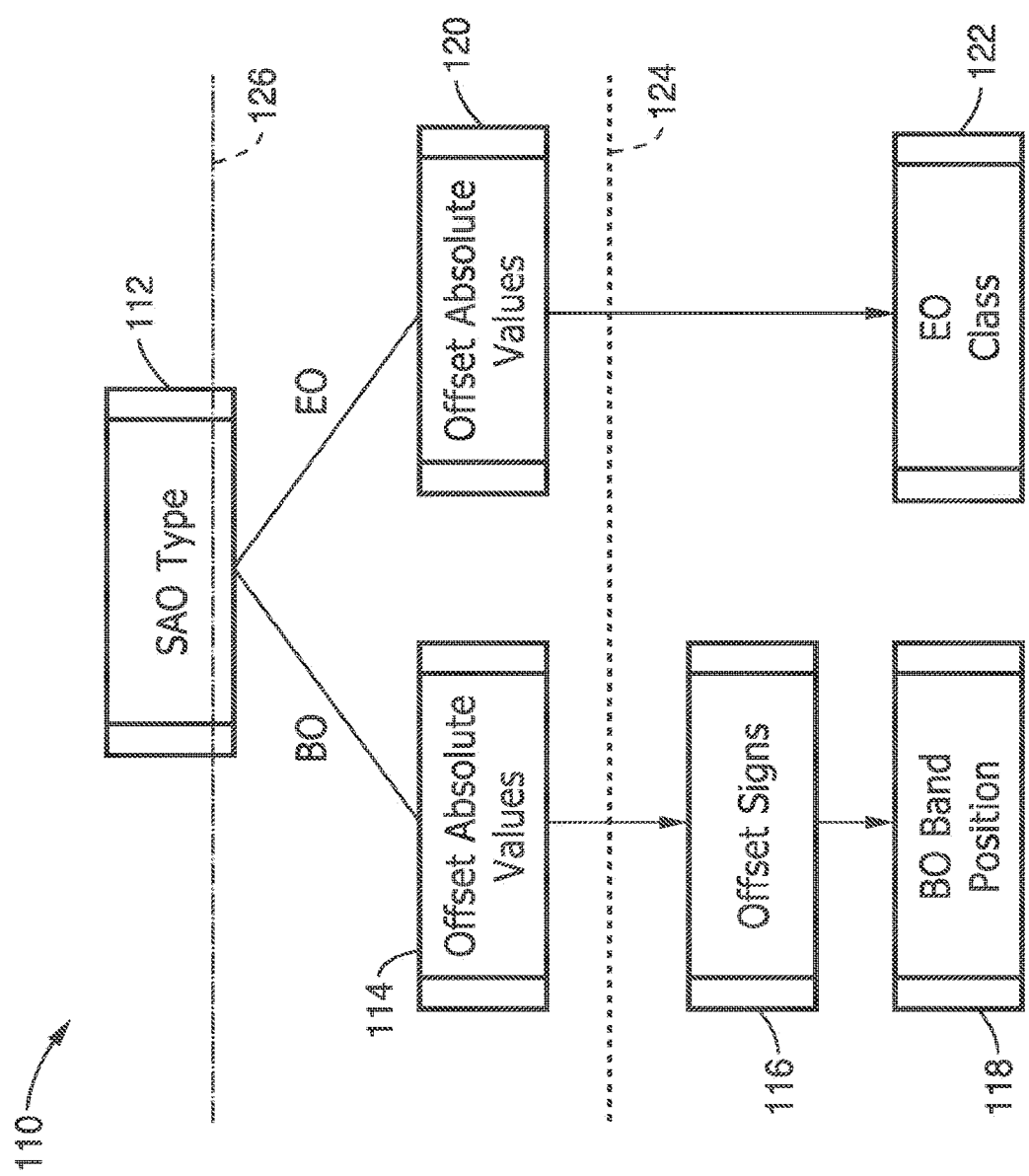
FIG. 3 is a flow diagram of a type first SAO (embodiment C) syntax according to an embodiment of the present invention.

FIG. 3 illustrates an example embodiment 110 of another SAO enhanced signaling mechanism according to the present invention spread across context and bypass coding. Two variations are shown according to which portions are context coded versus by-pass coded. SAO type is selected 112, with absolute values coded for band offset (BO) 114, or alternatively, edge offset (EO) 120. Coding offset signs are passed 116 for BO followed by BO band position 118. For edge offset coding, EO class is sent 122.

Two dashed lines 124, 126 are seen in the flowchart depicting two different separations of context coding (operations seen above the line), versus by-pass coding (operations seen below the line). For example, in one variation the flowchart steps above dashed line 124 represent context coded steps, while steps below line 124 represent steps coded with bypass coding. For example, SAO type 112, and offset absolute values for BO and EO are depicted above line 124, and thus are context coded. The coding of offset signs 116, BO band position 118, and EO class 122, are by-pass coded.

Considering dashed line position 126 seen passing through SAO type block 112, here a portion (e.g., first bin) of the SAO is context coded while the remaining bins are block coded. In either case, it can be seen from the flowchart that embodiment C provides a balanced signaling structure for EO and BO.

Current SAO types (in HEVC WD 7) consist of SAO on/off, 4 Edge Offset (EO) classes, and one Band Offset (BO). These options (SAO types) are signaled to the decoder using a Unary code with two contexts (e.g., CABAC coding), one on the first bin and one for the rest of the bins. In addition, for the BO type, band position is transmitted using FL codes.

The present invention considers that in providing a more regularized structure, the process can be improved in at least four different ways, as outlined. (1) While there are only two actual types in SAO (namely EO and BO), the SAO types in current design consists of 4 EO classes, yet only 1 BO. Therefore, the extra context in CABAC mode cannot track the statistics of EO versus BO. (2) The four EO classes correspond to 4 directions but have very different code lengths. Logically, due to the symmetry in a large-enough set of images, there should not be an advantage to a direction compared to the rest. This has been confirmed even on the HEVC test set which is a much smaller test set. The numbers of occurrences of the four directions are almost uniformly distributed hence FL codes are used. (3) Side information is transmitted only in BO. Side information for the EO classes (directions), however, are coded with SAO type and on/off switch. (4) Context coded bins and by-pass coded bins are interleaved in the current WM 7, because band positions of BO are encoded in by-pass mode before offsets coded with contexts.

In this embodiment of the invention, SAO type is first signaled and side information (i.e., EO classes and BO band position) is signaled separately. This configuration provides a balanced structure, reduced branches and improved throughput. These changes are itemized as follows. (a) The SAO type (sao_type_idx) is reduced to indicate only SAO on/off, BO and EO as shown in Table 14. (b) Parameter sao_type_idx is binarized using truncated unary. In one alternative context modeling is coded with only one context for the first bin and bypass coding for the second bin, or coded with two contexts: one for the first bin and the other for the second bin. (c) EO classes are signaled using sao_eo_class as is the same as that shown in Table 10, which is encoded by FLC with by-pass. (d) Reordering of syntax to avoid interleaving of context coded bins and by-pass coded bins.

These changes operate to reduce the number of context coded bins for SAO syntax (including SAO type and BO/EO information).

The following describes aspects of the SAO parameter semantics which were shown in Table 14. Parameter sao_eo_ class[cIdx][rx][ry] indicates the edge offset type as specified in Table 15 of current coding tree block at position rx and ry for the color component cIdx.

Table 16 provides examples of variable initialization for sao_Type_Idx_ctxIdx.

Table 17 illustrates syntax and binarization types for selected variables.

Interleaving Issue.

In the current HEVC WD7 and JCTVC-I0246, context coded bins and by-pass coded bins are interleaved. This interleaving limits the throughput of the CABAC engine. To resolve the interleaving issue, one element of the present invention reorders the syntax to group each category and have the context coded bin group before the by-pass coded bin group.

Embodiments of the present invention may be described with reference to flowchart illustrations of methods and systems according to embodiments of the invention, as well as algorithms, formulae, or other computational depictions, which may also be implemented as computer program products. In this regard, each block or step of a flowchart, and combinations of blocks (steps, or a combination thereof) in a flowchart, algorithm, formula, or computational depiction can be implemented by various means, such as hardware, firmware, software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. An apparatus for sample adaptive offset (SAO) signaling during entropy encoding of a video, the apparatus comprising: (a) a video encoder having a processor; (b) programming executable on said processor and configured for: (i) receiving a decoded video signal from a deblocking filter; (ii) indicating only SAO on/off, BO and EO within SAO type; (iii) binarizing SAO type using truncated unary; (iv) signaling said SAO type to a decoder; (v) coding absolute values for BO, or alternatively coding absolute values for EO, depending on whether SAO type is BO or EO; (vi) signaling absolute values for BO, or alternatively signaling absolute values for EO, to the decoder depending on whether SAO type is BO or EO; and (vii) coding offset signs for BO followed by coding BO band, or alternatively coding EO class, depending on whether SAO type is BO or EO; and (viii) signaling offset signs for BO followed signaling BO band, or alternatively signaling EO class, to the decoder depending on whether SAO type is BO or EO.

2. The apparatus of any preceding embodiment, wherein a first bin of SAO type is context coded while remaining parameters are by-pass coded.

3. The apparatus of any preceding embodiment, wherein SAO type, and absolute values for BO, and absolute values for EO are context coded, with remaining parameters by-pass coded.

4. The apparatus of any preceding embodiment, wherein said EO classes comprise four classes indicating direction.

5. The apparatus of any preceding embodiment: wherein said SAO type, BO offset absolute value, EO offset absolute value, BO offset signs, BO band position, and EO class comprise parameters having an arrangement in a given syntax; and further comprising programming configured for reordering of parameter syntax to avoid interleaving of context coded bins and by-pass coded, in response to having context coded bins grouped before by-pass coded bins.

6. The apparatus of any preceding embodiment, wherein said apparatus operates according to a High Efficiency Video Coding (HEVC) standard.

7. The apparatus of any preceding embodiment, wherein said apparatus requires only one band offset (BO) type.

8. The apparatus of any preceding embodiment, wherein said programming is configured for transmitting thirty two possible BO bands for said first non-zero band.

9. The apparatus of any preceding embodiment, wherein said programming is configured for performing context-adaptive binary arithmetic coding (CABAC).

10. The apparatus of any preceding embodiment, wherein said programming is configured for grouping both context coded bins and by-pass coded bins to improve throughput of context-adaptive binary arithmetic coding (CABAC).

11. An apparatus for sample adaptive offset (SAO) signaling during entropy encoding of a video, the apparatus comprising: (a) a video encoder having a processor; (b) programming executable on said processor and configured for: (i) receiving a decoded video signal from a deblocking filter; (ii) indicating only SAO on/off, BO and EO within SAO type; (iii) context coding only a first bin of SAO type, with remaining bins and parameters by-pass coded; (iv) binarizing SAO type using truncated unary; (v) signaling said SAO type; (vi) coding absolute values for BO, or alternatively absolute values for EO, depending on whether SAO type is BO or EO; (vii) signaling absolute values for BO, or alternatively signaling absolute values for EO, depending on whether SAO type is BO or EO; and (viii) coding offset signs for BO followed by coding BO band, or alternatively signaling EO class, depending on whether SAO type is BO or EO.

12. The apparatus of any preceding embodiment, wherein said EO classes comprise four classes indicating direction.

13. The apparatus of any preceding embodiment: wherein said SAO type, BO offset absolute value, EO offset absolute value, BO offset signs, BO band position, and EO class comprise parameters having a given syntax; and further comprising programming configured for reordering of parameter syntax to avoid interleaving of context coded bins and by-pass coded, in response to having context coded bins grouped before by-pass coded bins.

14. The apparatus of any preceding embodiment, wherein said apparatus operates according to a High Efficiency Video Coding (HEVC) standard.

15. The apparatus of any preceding embodiment, wherein said apparatus requires only one band offset (BO) type.

16. The apparatus of any preceding embodiment, wherein said programming is configured for transmitting thirty two possible BO bands for said first non-zero band.

17. The apparatus of any preceding embodiment, wherein said programming is configured for performing context-adaptive binary arithmetic coding (CABAC).

18. The apparatus of any preceding embodiment, wherein said programming is configured for grouping both context coded bins and by-pass coded bins to improve throughput of context-adaptive binary arithmetic coding (CABAC).

19. An apparatus for sample adaptive offset (SAO) signaling during entropy encoding of a video, the apparatus comprising: (a) a video encoder having a processor; (b) programming executable on said processor and configured for: (i) receiving a decoded video signal from a deblocking filter; (ii) indicating only SAO on/off, BO and EO within SAO type; (iii) binarizing SAO type using truncated unary, coded with a first and second context; (iv) signaling said SAO type; (v) coding absolute values for BO, or alternatively absolute values for EO, depending on whether SAO type is BO or EO; wherein SAO type, and absolute values for BO, and absolute values for EO are context coded, with remaining parameters by-pass coded; (vi) signaling absolute values for BO, or alternatively signaling absolute values for EO, depending on whether SAO type is BO or EO; and (vii) coding offset signs for BO followed by coding BO band, or alternatively signaling EO class, depending on whether SAO type is BO or EO.

20. The apparatus of any preceding embodiment: wherein said SAO type, BO offset absolute value, EO offset absolute value, BO offset signs, BO band position, and EO class comprise parameters having a given syntax; and further comprising programming configured for reordering of parameter syntax to avoid interleaving of context coded bins and by-pass coded, in response to having context coded bins grouped before by-pass coded bins.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

(Prior Art) Mapping of LCU SAO enable flags to a lcu_sao_enable_idx index

| LCU SAO enable flag | | | Combination | Code index |
|---|---|---|---|---|
| Y | Cb | Cr | index | (lcu_sao_enable_idx) |
| 0 | 0 | 0 | 0 | 0 |
| 0 | 0 | 1 | 1 | 5 |
| 0 | 1 | 0 | 2 | 6 |
| 0 | 1 | 1 | 3 | 7 |
| 1 | 0 | 0 | 4 | 1 |
| 1 | 0 | 1 | 5 | 2 |
| 1 | 1 | 0 | 6 | 3 |
| 1 | 1 | 1 | 7 | 4 |

TABLE 2

(Prior Art) SAO type table in JCTVC-I0193

| sao_type_idx | SAO type |
|---|---|
| 0 | 1D 0-degree edge |
| 1 | 1D 90-degree edge |
| 2 | 1D 135-degree edge |
| 3 | 1D 45-degree edge |
| 4 | Band |

TABLE 3

Embodiment A - Slice Data Syntax with Descriptor

| | Desc. |
|---|---|
| ```
slice_data( ) {
    CtbAddrRS = SliceCtbAddrRS
    CtbAddrTS = CtbAddrRStoTS[ CtbAddrRS ]
    moreDataFlag = 1
    if( adaptive_loop_filter_flag && alf_cu_control_flag )
        AlfCuFlagIdx = −1
    do {
        xCtb = InverseRasterScan( CtbAddrRS, CtbSize, CtbSize,
pic_width_in_luma_samples, 0 )
        yCtb = InverseRasterScan( CtbAddrRS, CtbSize, CtbSize,
pic_width_in_luma_samples, 1 )
        NumPCMBlock = 0
        CtbAddrInSlice = CtbAddrRS − ( slice_address >> SliceGranularity )
        if( slice_sample_adaptive_offset_flag[ 0 ])
            lcu_sao_enable_idx
        for( cIdx = 0; cIdx < 3; cIdx++ ) {
            if( slice_sample_adaptive_offset_flag[ cIdx ] &&LcuSaoEnableFlag[ 0 ][ xCtb ][
yCtb ])
                sao_param( xCtb, yCtb, cIdx )
        }
        moreDataFlag = coding_tree( xCtb, yCtb, Log2CtbSize, 0 )
        CtbAddrTS++
        CtbAddrRS = CtbAddrTStoRS[ CtbAddrTS ]
        if( moreDataFlag && ( ( tiles_or_entropy_coding_sync_idc = = 1 &&
            TileId[ CtbAddrTS ] != TileId[ CtbAddrTS − 1 ] ) ||
            ( tiles_or_entropy_coding_sync_idc = = 2 && CtbAddrTS % PicWidthInCtbs
= = 0 ) ) )
            rbsp_alignment( )
    } while( moreDataFlag )
}
``` | ac(v) |

TABLE 4

Embodiment A: SAO Parameter Syntax with Descriptor

| | Desc. |
|---|---|
| ```
sao_param( rx, ry, cIdx ) {
    if( rx > 0 ) {
        leftCtbInSlice = CtbAddrInSlice > 0
        leftCtbInTile = TileId[ CtbAddrTS ] = = TileId[ CtbAddrRStoTS[ CtbAddrRS − 1 ] ]
        if( leftCtbInSlice && leftCtbInTile&& LcuSaoEnableFlag[ cIdx ][ rx − 1][ ry ] )
            sao_merge_left_flag
    }
    if( ry > 0 && !sao_merge_left_flag ) {
        upCtbInSlice = (CtbAddrTS − CtbAddrRStoTS[CtbAddrRS − PicWidthInCtbs]) <=
CtbAddrInSlice
        upCtbInTile = TileId[ CtbAddrTS ] = = TileId[ CtbAddrRStoTS [ CtbAddrRS −
PicWidthInCtbs ] ]
        if( upCtbInSlice && upCtbInTile&& LcuSaoEnableFlag[ cIdx ][ rx − 1][ ry ] )
            sao_merge_up_flag
    }
    if( !sao_merge_up_flag && !sao_merge_left_flag&& LcuSaoEnableFlag[ cIdx ][ rx ][
ry ] ) {
        sao_type_idx[ cIdx ][ rx ][ ry ]
        if( sao_type_idx[ cIdx ][ rx ][ ry ] = =5 )
            sao_band_position[ cIdx ][ rx ][ ry ]
        if( sao_type_idx[ cIdx ][ rx ][ ry ] != 0 )
            for( i = 0; i < 4; i++ )
                sao_offset_abs[ cIdx ][ rx][ ry ][ i ]
        if( sao_type_idx[ cIdx ][ rx ][ ry ] = = 5 ) {
            for( i = 0; i < 4; i++ ) {
                if( sao_offset_abs[ cIdx ][ rx ][ ry ] != 0 )
                    sao_offset_sign[ cIdx ][ rx ][ ry ][ i ]
            }
        }
    }
}
``` | ae(v)<br><br><br><br>ae(v)<br><br><br>ae(v)<br>ae(v)<br><br>ae(v)<br><br><br>ae(v) |

TABLE 5

Embodiment A: Specifying SAO Type

| sao_type_idx[ cIdx ][ rx ][ ry ] | SAO type (informative) |
|---|---|
| 0 | 1D 0-degree edge offset |
| 1 | 1D 90-degree edge offset |
| 2 | 1D 135-degree edge offset |
| 3 | 1D 45-degree edge offset |
| 4 | Band offset |

TABLE 6

Embodiment A: Specifying SAO Slice Data Semantics

| | LcuSaoEnableFlag[ cIdx ][ rx ][ ry ] | | |
|---|---|---|---|
| lcu_sao_enable_idx | cIdx = 0 | cIdx = 1 | cIdx = 2 |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

TABLE 7

Embodiment B: SAO Types in JCTVC-J0268 + simplfied JCTVC-I0193

| sao_type_idx[cIdx][rx][ry] | SAO type (informative) |
|---|---|
| 0 | Band Offset (BO) |
| 1 | Edge Offset (EO) |

TABLE 8

Embodiment B: SAO Edge Offset Class

| sao_type_idx [cIdx][rx][ry] | SAO EO Class |
|---|---|
| 0 | 1D 0-degree edge |
| 1 | 1D 90-degree edge |
| 2 | 1D 135-degree edge |
| 3 | 1D 45-degree edge |

TABLE 9

Embodiment B: Specification of Slice Data Syntax

| | Descriptor |
|---|---|

```
slice_data( ) {
    CtbAddrRS = SliceCtbAddrRS
    CtbAddrTS = CtbAddrRStoTS[ CtbAddrRS ]
    moreDataFlag = 1
    if( adaptive_loop_filter_flag && alf_cu_control_flag )
        AlfCuFlagIdx = −1
    do {
        xCtb = InverseRasterScan( CtbAddrRS, CtbSize, CtbSize, pic_width_in_luma_samples, 0
)
        yCtb = InverseRasterScan( CtbAddrRS, CtbSize, CtbSize, pic_width_in_luma_samples, 1
)
        NumPCMBlock = 0
        CtbAddrInSlice = CtbAddrRS − (slice_address >> SliceGranularity )
        if( slice_sample_adaptive_offset_flag[ 0 ])
            lcu_sao_enable_idx                                                          ae(v)
        for( cIdx = 0; cIdx < 3; cIdx++ ) {
            if( slice_sample_adaptive_offset_flag[ cIdx ] &&LcuSaoEnableFlag[ 0 ][ xCtb ][ yCtb ])
                sao_param( xCtb, yCtb, cIdx )
        }
        moreDataFlag = coding_tree( xCtb, yCtb, Log2CtbSize, 0 )
        CtbAddrTS++
        CtbAddrRS = CtbAddrTStoRS[ CtbAddrTS ]
        if( moreDataFlag && ( ( tiles_or_entropy_coding_sync_idc = = 1 &&
            TileId[ CtbAddrTS ] != TileId[ CtbAddrTS − 1 ] ) ||
            ( tiles_or_entropy_coding_sync_idc = = 2 && CtbAddrTS % PicWidthInCtbs = = 0 ) )
)
            rbsp_alignment( )
    } while( moreDataFlag )
}
```

TABLE 10

Embodiment B: SAO Parameter Syntax

| | Descriptor |
|---|---|

```
sao_param( rx, ry, cIdx ){
    if( rx > 0) {
        leftCtbInSlice = CtbAddrInSlice > 0
        leftCtbInTile = TileId[ CtbAddrTS ] = = TileId[ CtbAddrRStoTS[ CtbAddrRS − 1 ] ]
```

TABLE 10-continued

Embodiment B: SAO Parameter Syntax

|  | Descriptor |
|---|---|
| `if( leftCtbInSlice && leftCtbInTile&& LcuSaoEnableFlag[ cIdx ][ rx − 1][ ry ] )`<br>  `sao_merge_left_flag`<br>`}`<br>`if( ry > 0 && !sao_merge_left_flag ) {`<br>  `upCtbInSlice = (CtbAddrTS − CtbAddrRStoTS[CtbAddrRS − PicWidthInCtbs]) <= CtbAddrInSlice`<br>  `upCtbInTile = TileId[ CtbAddrTS ] == TileId[ CtbAddrRStoTS[ CtbAddrRS − PicWidthInCtbs ] ]`<br>  `if( upCtbInSlice && upCtbInTile&&LcuSaoEnableFlag[ cIdx ][ rx − 1][ ry ] )`<br>    `sao_merge_up_flag`<br>`}`<br>`if( !sao_merge_up_flag && !sao_merge_left_flag&& LcuSaoEnableFlag[ cIdx ][ rx ][ ry ] ) {`<br>  `sao_type_idx[ cIdx ][ rx ][ ry ]`<br>  `if( sao_type_idx[ cIdx ][ rx ][ ry ] != 0 )`<br>    `for( i = 0; i < 4; i++ )`<br>      `sao_offset_abs[ cIdx ][ rx ][ ry ][ i ]`<br>  `if( sao_type_idx[ cIdx ][ rx ][ ry ] == 5 ) {`<br>    `for( i = 0; i < 4; i++ ) {`<br>      `if( sao_offset_abs[ cIdx ][ rx ][ ry ] != 0)`<br>        `sao_offset_sign[ cIdx ][ rx ][ ry ][ i ]`<br>    `}`<br>  `}`<br>    `sao_band_position[ cIdx ][ rx ][ ry ]`<br>  `}`<br>  `else`<br>    `sao_eo_class[ cIdx ][ rx ][ ry ]`<br>`}`<br>`}` | ae(v)<br><br><br><br><br><br><br><br>ae(v)<br><br><br><br><br><br>ae(v)<br><br><br>ae(v)<br><br><br><br>ae(v)<br><br><br>ae(v)<br><br>ae(v) |

TABLE 11

Embodiment B: Specification of SAO Type

| sao_type_idx[ cIdx ][ rx ][ ry ] | SAO type (informative) |
|---|---|
| 0 | Band offset |
| 1 | Edge offset |

TABLE 12

Embodiment B: Specification of LcuSaoEnableFlag for Three Color Components

|  | LcuSaoEnableFlag[ cIdx ][ rx ][ ry ] | | |
|---|---|---|---|
| lcu_sao_enable_idx | cIdx = 0 | cIdx = 1 | cIdx = 2 |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

TABLE 13

Embodiment B: Specification of hPos and vPos for SAO

| sao_eo_class[ cIdx ][ rx ][ ry ] | 0 | 1 | 2 | 3 |
|---|---|---|---|---|
| hPos[0] | −1 | 0 | −1 | 1 |
| hPos[1] | 1 | 0 | 1 | −1 |
| vPos[0] | 0 | −1 | −1 | −1 |
| vPos[1] | 0 | 1 | 1 | 1 |

TABLE 14

Embodiment C: Specification of SAO Type

| sao_type_idx[ cIdx ][ rx ][ ry ] | SAO type (informative) |
|---|---|
| 0 | Not applied |
| 1 | Band offset |
| 2 | Edge offset |

TABLE 15

Embodiment C: Specification of SAO Edge Offset Class

| sao_eo_class [ cIdx ][ rx ][ ry ] | SAO edge offset class (informative) |
|---|---|
| 0 | 1D 0-degree edge offset |
| 1 | 1D 90-degree edge offset |
| 2 | 1D 135-degree edge offset |
| 3 | 1D 45-degree edge offset |

TABLE 16

Embodiment C: Examples of Variable initValue for sao_type_idxIdx

|  | sao_type_idx ctxIdx | | | | | |
|---|---|---|---|---|---|---|
| Init variable | 0 | 1 | 2 | 3 | 4 | 5 |
| initValue | 200 | 157 | 185 | 157 | 160 | 157 |

TABLE 17

Embodiment C: Syntax and Binarization Types for Select Variables

| Syntax element | initType | Type of binarization | maxBinIdxCtx | ctxIdxTable | ctxIdxOffset |
|---|---|---|---|---|---|
| sao_type_idx | 0 | TU, cMax = 2 | 1 | Table 16 | 0 |
| | 1 | | 1 | Table 16 | 2 |
| | 2 | | 1 | Table 16 | 4 |
| sao_eo_class | 0 | FL, cMax = 2 | - na - | - na - | - na - * |
| | 1 | | - na - | - na - | - na - * |
| | 2 | | - na - | - na - | - na - * |

* uses Decode Bypass

What is claimed is:

1. An image processing apparatus, comprising:
at least one processor configured to:
receive an encoded bitstream including Sample Adaptive Offset (SAO) parameters, wherein the SAO parameters comprise:
a SAO type, wherein the SAO type represents one of a Not Applied, a Band Offset (BO), or an Edge Offset (EO),
one of absolute values for the BO or absolute values for the EO, wherein the one of the absolute values for the BO or the absolute values for the EO is coded based on a by-pass coding operation and whether the SAO type is one of the BO or the EO,
an offset sign and a BO band position based on the BO that is set as the SAO type, wherein the offset sign and the BO band position are coded based on the by-pass coding operation, and
an EO class based on the EO that is set as the SAO type;
decode a first bin of the SAO type, wherein the first bin of the SAO type is encoded based on a context coding operation; and
decode remaining bins of the SAO parameters, wherein the remaining bins of the SAO parameters are encoded based on the by-pass coding operation.

2. The image processing apparatus of claim 1, wherein the at least one processor is further configured to decode a second bin of the SAO type, wherein
the second bin of the SAO type is one of the remaining bins of the SAO parameters, and
the second bin of the SAO type is encoded based on the by-pass coding operation.

3. The image processing apparatus of claim 2, wherein the SAO parameters of the SAO type are binarized based on truncated unary binarization.

4. The image processing apparatus of claim 3, wherein the at least one processor is further configured to decode the SAO parameters of the EO class, wherein the EO class is binarized based on a fixed length code.

5. The image processing apparatus of claim 4, wherein the EO class is one of four classes indicating direction.

6. The image processing apparatus of claim 1, wherein:
the encoded bitstream comprises an ordered sequence of the SAO parameters, and
the SAO parameters comprise the first bin of the SAO type ordered before the remaining bins of the SAO parameters.

7. An image processing method, comprising:
in an image processing apparatus:
receiving an encoded bitstream including Sample Adaptive Offset (SAO) parameters, wherein the SAO parameters comprise:
a SAO type, wherein the SAO type represents one of a Not Applied, a Band Offset (BO), or an Edge Offset (EO),
one of absolute values for the BO or absolute values for the EQ wherein the one of the absolute values for the BO or the absolute values for the EO is coded based on a by-pass coding operation and whether the SAO type is one of the BO or the EO,
an offset sign and a BO band position based on the BO that is set as the SAO type, wherein the offset sign and the BO band position are coded based on the by-pass coding operation, and
an EO class based on the EO that is set as the SAO type;
decoding a first bin of the SAO type, wherein the first bin of the SAO type is encoded based on a context coding operation; and
decoding remaining bins of the SAO parameters, wherein the remaining bins of the SAO parameters are encoded based on the by-pass coding operation.

8. The image processing method of claim 7, further comprising:
decoding a second bin of the SAO type, wherein:
the second bin of the SAO type is one of the remaining bins of the SAO parameters, and
the second bin of the SAO type is encoded based on the by-pass coding operation.

9. The image processing method of claim 8, wherein the SAO parameters of the SAO type are binarized based on truncated unary binarization.

10. The image processing method of claim 9, further comprising
decoding the SAO parameters of the EO class, wherein the EO class is binarized based on a fixed length code.

11. The image processing method of claim 10, wherein the EO class is one of four classes indicating direction.

12. The image processing method of claim 7, wherein:
the encoded bitstream comprises an ordered sequence of the SAO parameters, and
the SAO parameters comprise the first bin of the SAO type ordered before the remaining bins of the SAO parameters.

13. An image processing apparatus, comprising:
a memory to store instructions; and
at least one processor configured to execute the instructions to:
receive an encoded bitstream including Sample Adaptive Offset (SAO) parameters, wherein the SAO parameters comprise:
a SAO type, wherein the SAO type represents one of a Not Applied, a Band Offset (BO), or an Edge Offset (EO),
one of absolute values for the BO or absolute values for the EO, wherein the one of the absolute values for the BO or the absolute values for the EO is coded based on a by-pass coding operation and whether the SAO type is one of the BO or the EO, an offset sign and a BO band position based on the BO that is set as the SAO type,
wherein the offset sign and the BO band position are coded based on the by-pass coding operation, and an EO class based on the EO that is set as the SAO type, wherein the EO class is coded based on the by-pass coding operation;

decode a first bin of the SAO type, wherein the first bin of the SAO type is coded based on a context coding operation;

decode remaining bins of the SAO parameters, wherein the remaining bins of the SAO parameters are coded based on the by-pass coding operation;

decode one of the absolute values for the BO or the absolute values for the EO, based on the by-pass coding operation and whether the SAO type is one of the BO or the EO; and decode one of the offset sign for the BO and subsequently a BO band or the EO class, based on the by-pass coding operation and whether the SAO type is one of the BO or the EO.

* * * * *